US012785002B2

(12) United States Patent
Kawaguchi et al.

(10) Patent No.: US 12,785,002 B2
(45) Date of Patent: Nov. 3, 2026

(54) ELECTROMAGNETIC RELAY

(71) Applicant: OMRON Corporation, Kyoto (JP)

(72) Inventors: Naoki Kawaguchi, Kyoto (JP); Takeshi Nishida, Kyoto (JP); Ryota Minowa, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 344 days.

(21) Appl. No.: 18/278,619

(22) PCT Filed: Jan. 18, 2022

(86) PCT No.: PCT/JP2022/001484
§ 371 (c)(1),
(2) Date: Aug. 23, 2023

(87) PCT Pub. No.: WO2022/185746
PCT Pub. Date: Sep. 9, 2022

(65) Prior Publication Data
US 2024/0128034 A1 Apr. 18, 2024

(30) Foreign Application Priority Data
Mar. 5, 2021 (JP) ................................ 2021-035410

(51) Int. Cl.
*H01H 9/44* (2006.01)
*H01H 50/38* (2006.01)
*H01H 50/54* (2006.01)

(52) U.S. Cl.
CPC ............ *H01H 9/443* (2013.01); *H01H 50/38* (2013.01); *H01H 50/54* (2013.01)

(58) Field of Classification Search
CPC ................................ H01H 9/443; H01H 50/38
(Continued)

(56) References Cited

U.S. PATENT DOCUMENTS 4,451,718 A * 5/1984 Yamagata ................ H01H 9/44 218/27
7,145,422 B2 * 12/2006 Imanishi ................ H01H 9/443 335/133

(Continued)

FOREIGN PATENT DOCUMENTS

CN 115547756 A * 12/2022 ............ H01H 50/18
JP 2005-108768 A 4/2005

(Continued)

OTHER PUBLICATIONS

The Office Action of the corresponding Korean application No. 10-2023-7027731 issued on Nov. 16, 2024.

(Continued)

*Primary Examiner* — Alexander Talpalatski
(74) *Attorney, Agent, or Firm* — SHINJYU GLOBAL IP

(57) ABSTRACT

An electromagnetic relay includes a first fixed terminal, a first fixed contact, a second fixed terminal, a second fixed contact, a first movable contact, a second movable contact, a movable contact piece, a drive device, an outer magnet, and an inner magnet. The second fixed terminal is disposed apart from the first fixed terminal in a first direction. The first movable contact and the second movable contact are disposed to face the first fixed contact and the second fixed contact, respectively, in a second direction. The outer magnet generates a magnetic field to elongate an arc generated between the first fixed contact and the first movable contact and between the second fixed contact and the second movable contact. The inner magnet generates a magnetic field to elongate the arc in a third direction.

10 Claims, 19 Drawing Sheets

(58) Field of Classification Search
USPC .......................................................... 335/201
See application file for complete search history.

(56) References Cited

U.S. PATENT DOCUMENTS

| | | | | | |
|---|---|---|---|---|---|
| 8,823,474 | B2 * | 9/2014 | Kakimoto | H01H 9/46 | 335/201 |
| 9,007,156 | B2 * | 4/2015 | Hiraiwa | H01H 9/443 | 335/78 |
| 10,636,602 | B2 * | 4/2020 | Iwamoto | H01H 50/38 | |
| 2014/0159837 | A1 * | 6/2014 | Hiraiwa | H01H 9/443 | 335/201 |
| 2015/0262777 | A1 * | 9/2015 | Tsurusu | H01H 50/04 | 335/201 |
| 2021/0304994 | A1 | 9/2021 | Mori et al. | | |

FOREIGN PATENT DOCUMENTS

| | | | |
|---|---|---|---|
| JP | 2011-204480 | A | 10/2011 |
| JP | 2014-110094 | A | 6/2014 |
| JP | 2016-012505 | A | 1/2016 |
| JP | 2019-096474 | A | 6/2019 |
| JP | 2020-030911 | A | 2/2020 |

OTHER PUBLICATIONS

The International Search Report of International Application No. PCT/JP2022/001484 issued on Mar. 15, 2022.

The Written Opinion of the International Searching Authority of International Application No. PCT/JP2022/001484 issued on Mar. 15, 2022.

* cited by examiner

ELECTROMAGNETIC RELAY

CROSS-REFERENCE TO RELATED APPLICATION

This application is the U.S. National Phase of International Application No. PCT/JP2022/001484, filed on Jan. 18, 2022. That application claims priority to Japanese Patent Application No. 2021-035410, filed Mar. 5, 2021. The contents of both of these applications are incorporated herein by reference.

FIELD

The claimed invention relates to electromagnetic relays.

BACKGROUND

In an electromagnetic relay, arcing occurs at the contacts when current is interrupted. Therefore, some electromagnetic relays are equipped with a magnet for extinguishing an arc. The Lorentz force acting on the arc by the magnet elongates the arc, thereby rapidly extinguishing the arc.

For example, in the electromagnetic relay of Japanese Laid-open Patent Application Publication No. 2011-204480, a pair of magnets are disposed outside the first fixed contact and the second fixed contact. The pair of magnets are disposed apart from each other in the longitudinal direction of the movable plate. The pair of magnets generate a magnetic field for elongating the arc in a direction that intersects with the longitudinal direction of the movable plate.

SUMMARY

In the electromagnetic relay described above, hot gas or metal vapor generated between the first fixed terminal and the second fixed terminal can short-circuit the arc between the first fixed terminal and the second fixed terminal, causing the arc to continue. In that case, it becomes difficult to quickly extinguish the arc, and the circuit-breaking performance of the electromagnetic relay deteriorates. An object of the claimed invention is to reduce deterioration in breaking performance due to short-circuiting by an arc between fixed terminals in an electromagnetic relay.

An electromagnetic relay according to one aspect of the claimed invention includes a first fixed terminal, a first fixed contact, a second fixed terminal, a second fixed contact, a first movable contact, a second movable contact, and a movable contact piece, a drive device, an outer magnet, and an inner magnet. The first fixed contact is connected to the first fixed terminal. The second fixed terminal is disposed apart in a first direction from the first fixed terminal. The second fixed contact is connected to the second fixed terminal. The first movable contact is disposed to face the first fixed contact in a second direction. The second direction is a direction that intersects with the first direction. The second movable contact is disposed to face the second fixed contact in the second direction. The movable contact piece is connected to the first movable contact and the second movable contact. The drive device moves the movable contact piece in the second direction.

The outer magnet is disposed outside the first fixed terminal and the second fixed terminal. The outer magnet generates a magnetic field to elongate an arc generated between the first fixed contact and the first movable contact and between the second fixed contact and the second movable contact. The inner magnet is at least partially disposed between the first fixed terminal and the second fixed terminal as seen from the second direction. The inner magnet generates a magnetic field to elongate the arc in a third direction. The third direction is a direction that intersects with the first direction and the second direction.

In the electromagnetic relay according to the present aspect, the arc is elongated by the magnetic field generated by the outer magnet. The arc is thereby quickly extinguished. Also, even if an arc short-circuits between the first fixed terminal and the second fixed terminal, the short-circuited arc is elongated in the third direction by the magnetic field generated by the inner magnet. As a result, the short-circuited arc between the first fixed terminal and the second fixed terminal can be quickly extinguished. As a result, deterioration in the breaking performance of the electromagnetic relay is reduced.

The electromagnetic relay may further include a protrusion. The protrusion may be disposed in the third direction with respect to the outer magnet. The protrusion may extend toward the inner magnet. In this case, the arc elongated in the third direction is expanded to the left and right of the protrusion. The arc is thereby quickly extinguished.

The protrusion may have a tapered shape toward the inner magnet. In this case, the arc is more effectively expanded to the left and right by the protrusion. The arc is thereby quickly extinguished. The protrusion may be made of insulating material. In this case, the arc is quickly extinguished.

The first fixed terminal may include a first corner facing outward of the first fixed terminal. In this case, the direction in which the arc elongates from the first fixed terminal can be controlled by the first corner. Thereby, the arc can be easily elongated toward the outside of the first fixed terminal.

The second fixed terminal may include a second corner facing outward of the second fixed terminal. In this case, the direction in which the arc elongates from the second fixed terminal can be controlled by the second corner. Thereby, the arc can be easily elongated toward the outside of the second fixed terminal.

The inner magnet may include a first surface and a second surface. The second surface may be closer to the first fixed contact and the second fixed contact than the first surface. At least the second surface of the inner magnet may be covered with an insulating material. In this case, the inner magnet is protected from an arc by the insulating material.

The inner magnet may include an intermediate portion, a first portion, and a second portion. The intermediate portion may be located between the first fixed terminal and the second fixed terminal as seen from the second direction. The first portion may overlap the first fixed terminal as seen from the second direction. The second portion may overlap the second fixed terminal as seen from the second direction. In this case, a range over which the arc is elongated by the magnetic field from the inner magnet is increased.

DETAILED DESCRIPTION

Figure 1:
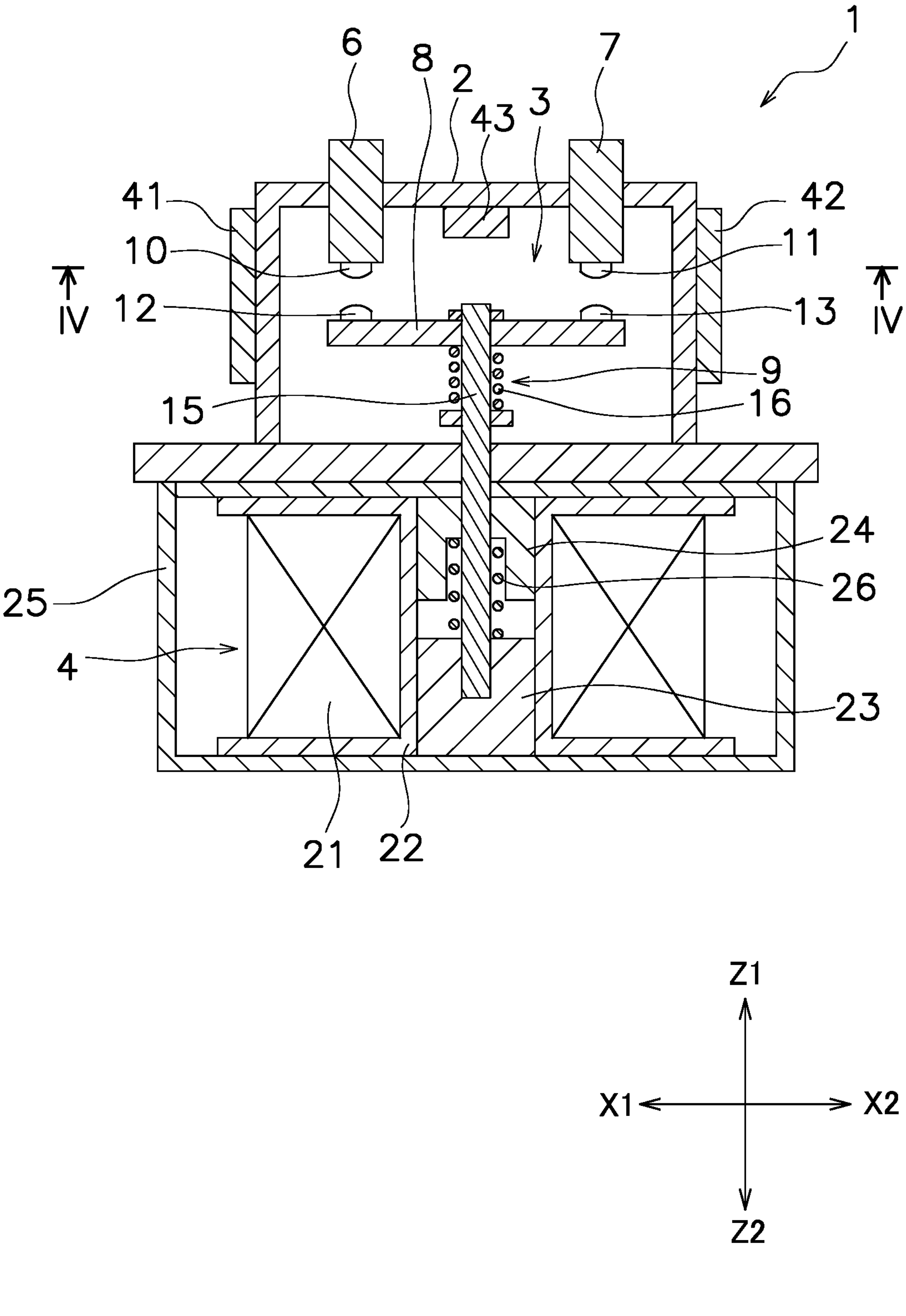
FIG. 1 is a section view of an electromagnetic relay in an open state.

An electromagnetic relay according to an embodiment of the claimed invention will be described below with reference to the drawings. FIG. 1 is a section view of an electromagnetic relay 1 according to an embodiment. As shown in FIG. 1, the electromagnetic relay 1 includes a case 2, a contact device 3, and a drive device 4. The case 2 is made of an insulating material such as resin or ceramic. The contact device 3 is accommodated in the case 2.

The contact device 3 includes a first fixed terminal 6, a second fixed terminal 7, a movable contact piece 8, a movable mechanism 9, a first fixed contact 10, a second fixed contact 11, a first movable contact 12, and the second movable contact 13.

In the following description, a direction in which the movable contact piece 8 extends is defined as a first direction (X1, X2). The first direction (X1, X2) include a first longitudinal direction (X1) and a second longitudinal direction (X2). The second longitudinal direction (X2) is opposite to the first longitudinal direction (X1). A direction from the second fixed contact 11 to the first fixed contact 10 is defined as the first longitudinal direction (X1). A direction from the first fixed contact 10 to the second fixed contact 11 is defined as the second longitudinal direction (X2).

A direction in which the first fixed contact 10 and the first movable contact 12 face each other is defined as a second direction (Z1, Z2). The second direction (Z1, Z2) include upward (Z1) and downward (Z2). The direction from the first movable contact 12 to the first fixed contact 10 is defined as upward (Z1). A direction from the first fixed contact 10 to the first movable contact 12 is defined as downward (Z2).

The first fixed terminal 6, the second fixed terminal 7, the movable contact piece 8, the first fixed contact 10, the second fixed contact 11, the first movable contact 12, and the second movable contact 13 are made of electrically conductive materials. For example, the first fixed terminal 6, the second fixed terminal 7, and the movable contact piece 8 may be made of metal materials known as terminal materials such as phosphor bronze, beryllium copper, brass, or tough pitch copper. However, the first fixed terminal 6, the second fixed terminal 7, and the movable contact piece 8 may be made of materials different from these materials. The first fixed contact 10, the second fixed contact 11, the first movable contact 12, and the second movable contact 13 are made of metal materials known as contact materials such as copper-based metal or silver-based metal.

The first fixed terminal 6 and the second fixed terminal 7 extend in the second direction (Z1, Z2). The first fixed terminal 6 and the second fixed terminal 7 have, for example, a cylindrical shape. The first fixed terminal 6 and the second fixed terminal 7 are disposed apart from each other in the first direction (X1, X2). The first fixed contact is connected to the first fixed terminal 6. The second fixed contact 11 is connected to the second fixed terminal 7. The first fixed contact 10 and the second fixed contact 11 are disposed inside the case 2.

The movable contact piece 8, the first movable contact 12, and the second movable contact 13 are disposed inside the case 2. The first movable contact 12 and the second movable contact 13 are connected to the movable contact piece 8. The first movable contact 12 faces the first fixed contact 10. The first movable contact 12 is configured to contact and separate from the first fixed contact 10. The second movable contact 13 faces the second fixed contact 11. The second movable contact 13 is configured to contact and separate from the second fixed contact 11. The first movable contact 12 is disposed apart from the second movable contact 13 in the first direction (X1, X2).

Figure 2:
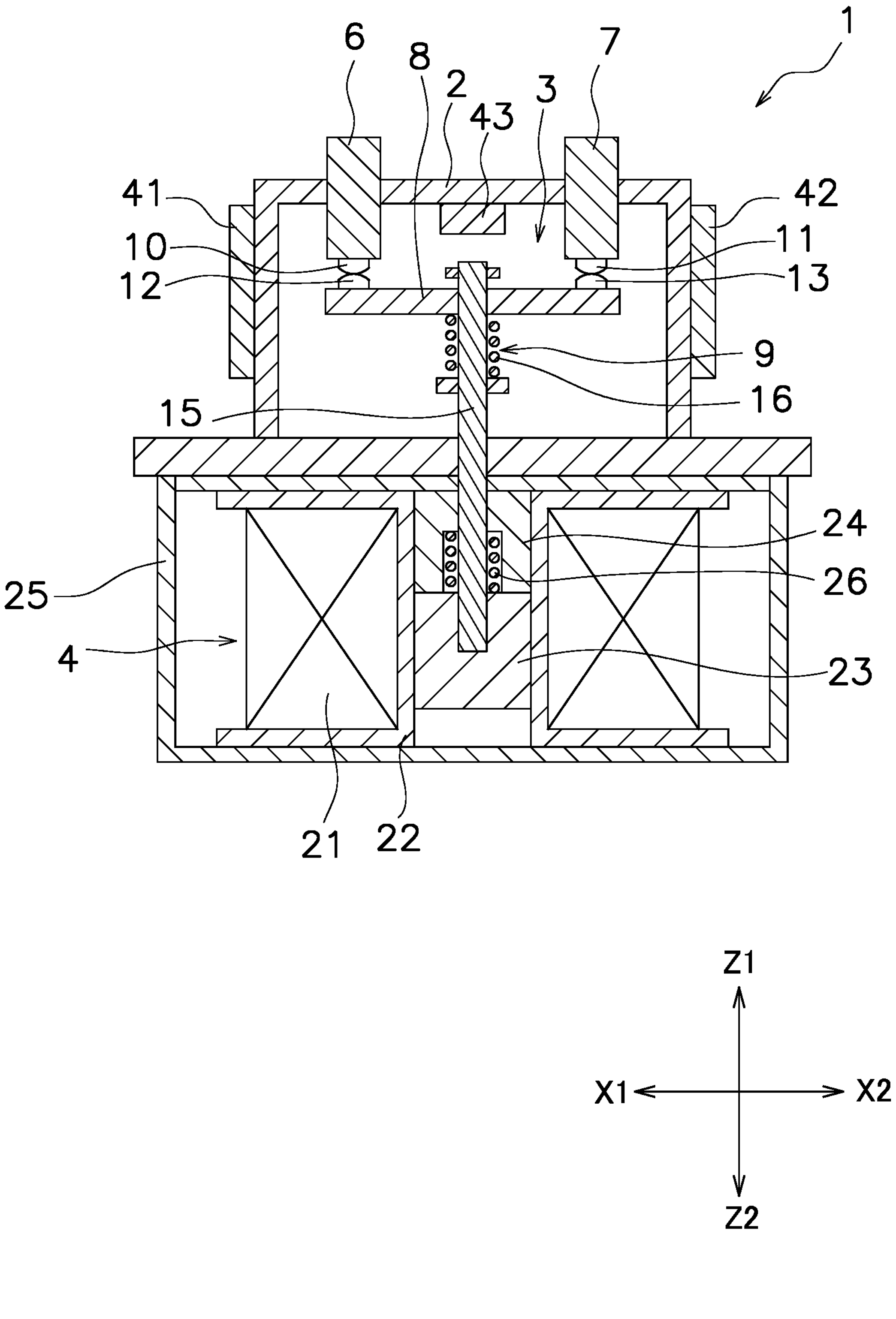
FIG. 2 is a section view of the electromagnetic relay in a closed state.

The movable contact piece 8 is movable in the second direction (Z1, Z2). The movable contact piece 8 is movable between an open position shown in FIG. 1 and a closed position shown in FIG. 2. As shown in FIG. 1, when the movable contact piece 8 is at the open position, the movable contacts 12 and 13 are separated from the fixed contacts 10 and 11. As shown in FIG. 2, when the movable contact piece 8 is at the closed position, the movable contacts 12 and 13 are in contact with the fixed contacts 10 and 11. Hereinafter, a direction in which the movable contacts 12 and 13 approach the fixed contacts 10 and 11 is defined as a contact direction. A direction in which the movable contacts 12 and 13 separate from the fixed contacts 10 and 11 is defined as a separation direction.

The movable mechanism 9 supports the movable contact piece 8. The movable mechanism 9 includes a drive shaft 15 and a contact spring 16. The drive shaft is connected to the movable contact piece 8. The drive shaft 15 extends in the second direction (Z1, Z2) and extends through the movable contact piece 8 in the second direction (Z1, Z2). The drive shaft 15 is configured to move in the second direction (Z1, Z2). The contact spring 16 biases the movable contact piece 8 in the contact direction.

The drive device 4 includes a coil 21, a spool 22, a movable iron core 23, a fixed iron core 24, a yoke 25, and a return spring 26. The drive device 4 moves the movable contact piece 8 between the open position and the closed position via the movable mechanism 9 by an electromagnetic force. The coil 21 is wound around the spool 22. The movable iron core 23 and the fixed iron core 24 are disposed inside the spool 22. The movable iron core 23 is connected to the drive shaft 15. The movable iron core 23 is movable in the second direction (Z1, Z2). The fixed iron core 24 is disposed to face the movable iron core 23. The return spring 26 biases the movable iron core 23 in the separation direction.

In the electromagnetic relay 1, when the coil 21 is energized, the magnetic force generated by the magnetic field generated by the coil 21 attracts the movable iron core 23 to the fixed iron core 24. Thereby, the movable iron core 23 and the drive shaft 15 move in the contact direction against the biasing force of the return spring 26. Thus, the movable contact piece 8 moves to the closed position shown in FIG. 2. After the movable contacts 12 and 13 contact the fixed contacts 10 and 11, the contact spring 16 is compressed by further movement of the drive shaft 15 in the contact direction.

When the coil 21 is de-energized, the movable iron core 23 and the drive shaft are moved in the separation direction by the biasing force of the return spring 26. As a result, the movable contact piece 8 moves to the open position shown in FIG. 1 and the movable contacts 12 and 13 separate from the fixed contact 10 and 11.

The electromagnetic relay 1 includes first and second outer magnets 41 and 42, respectively. The first and second outer magnets 41 and 42 generate magnetic fields for elongating arcs generated between the first fixed contact 10 and the first movable contact 12 and between the second fixed contact 11 and the second movable contact 13. The first and second outer magnets 41 and 42 are disposed outside the first fixed terminal 6 and the second fixed terminal 7 in the first direction (X1, X2).

The first outer magnet 41 and the second outer magnet 42 are permanent magnets. The first outer magnet 41 and the second outer magnet 42 are disposed around the case 2. However, the first outer magnet 41 and the second outer magnet 42 may be disposed inside the case 2. The first outer magnet 41 is disposed in the first longitudinal direction (X1) with respect to the first fixed terminal 6. The second outer magnet 42 is disposed in the second longitudinal direction (X2) with respect to the second fixed terminal 7.

Figure 3:
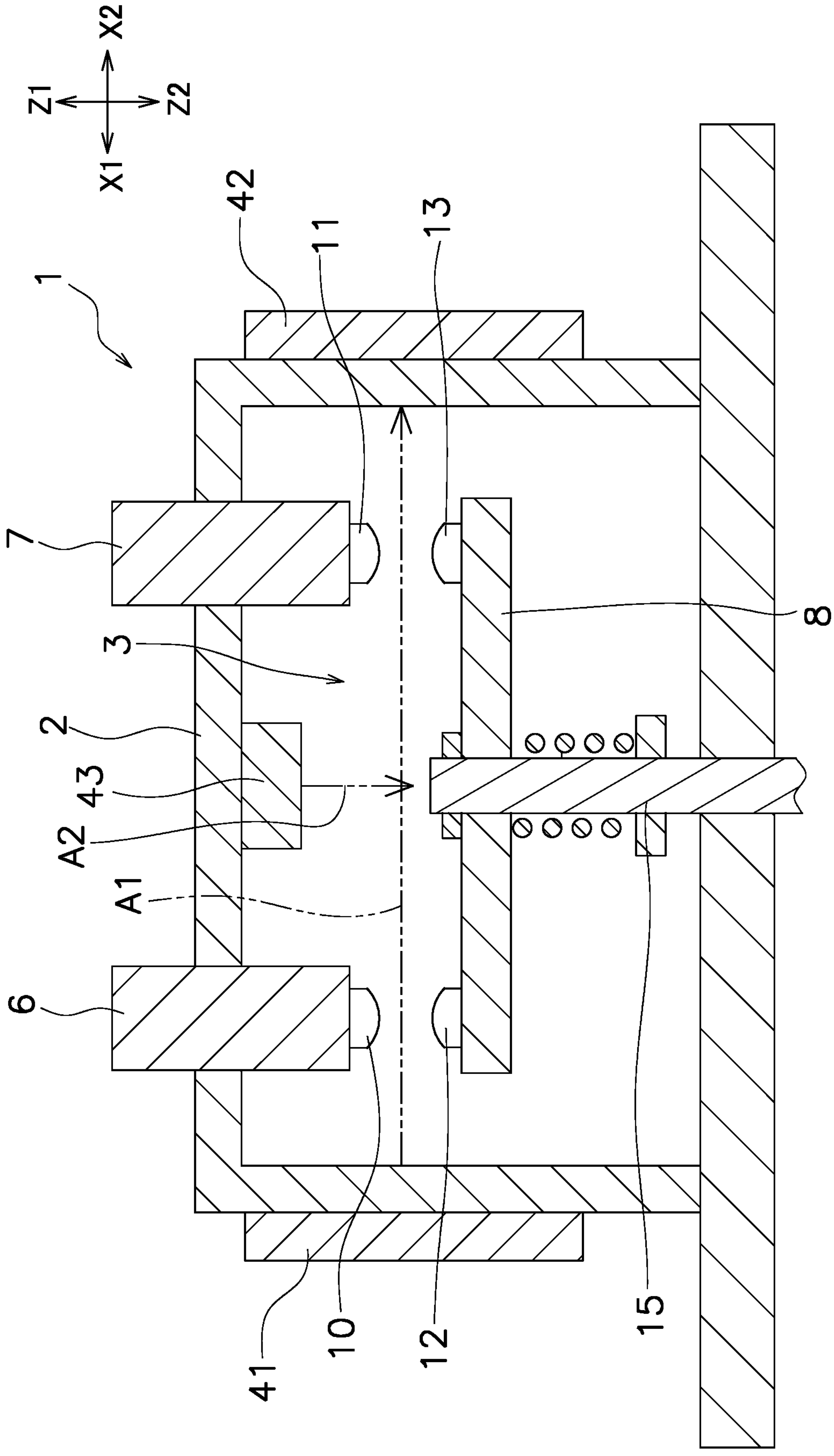
FIG. 3 is an enlarged view of a contact device.
Figure 4:
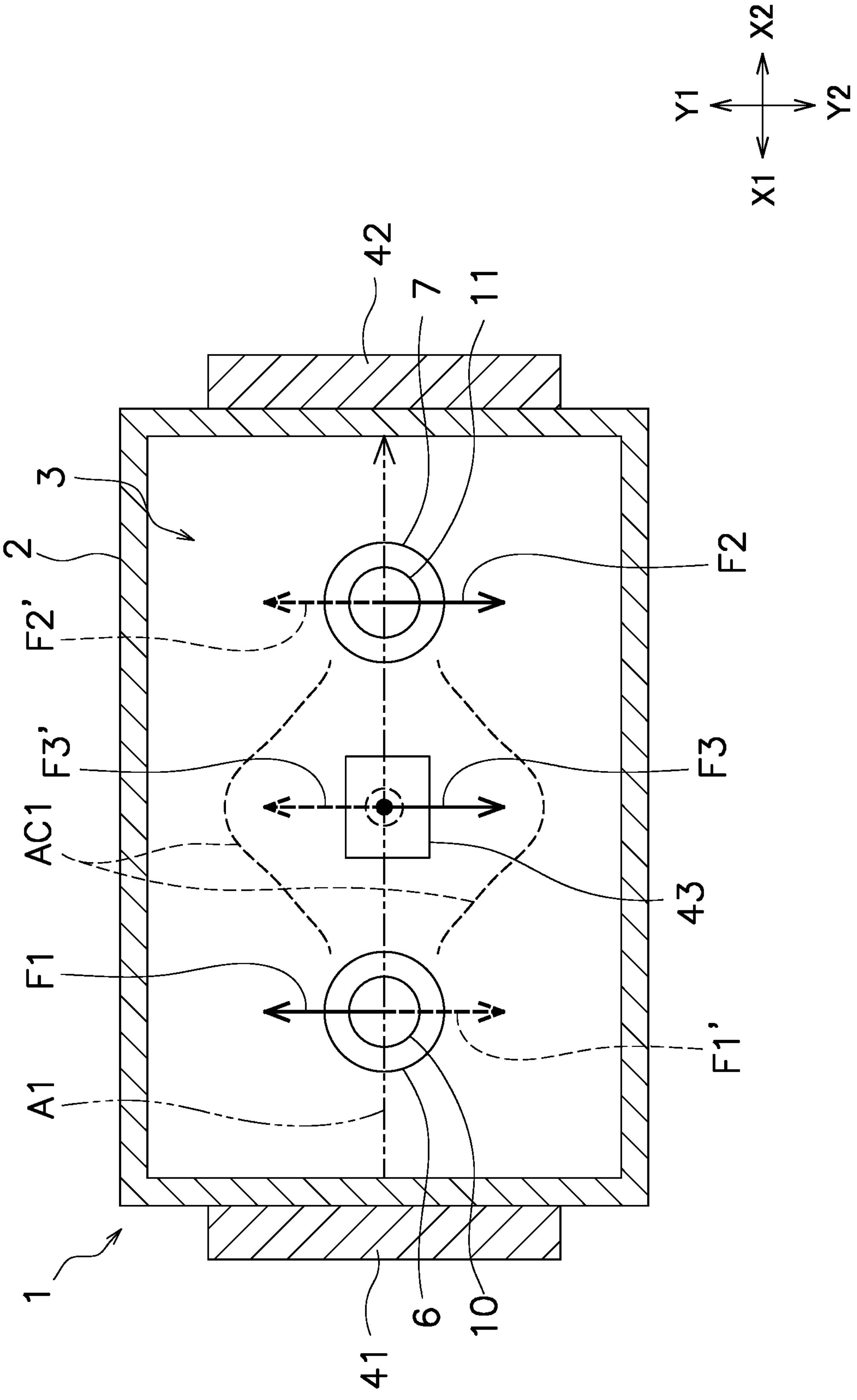
FIG. 4 is a section view along IV-IV in FIG. 1.

FIG. 3 is an enlarged view of the contact device 3. FIG. 4 is a section view along IV-IV in FIG. 1. Hereinafter, a direction perpendicular to the first direction (X1, X2) and the second direction (Z1, Z2) is defined as a third direction (Y1, Y2). Also, one direction of the third direction (Y1, Y2) is defined as a first lateral direction (Y1), and a direction opposite to the first lateral direction (Y1) is defined as a second lateral direction (Y2).

The first outer magnet 41 and the second outer magnet 42 generate a magnetic field inside the case 2. An arrow A1 indicated by a two-dot chain line in FIGS. 3 and 4 indicates the magnetic field generated by the first outer magnet 41 and the second outer magnet 42. The first outer magnet 41 and the second outer magnet 42 are disposed with different poles facing each other. For example, the north pole of the first outer magnet 41 faces the south pole of the second outer magnet 42.

When a current flows from the first fixed terminal 6 through the movable contact piece 8 to the second fixed terminal 7, as shown in FIG. 4, a first Lorentz force F1 acts on the arc generated between the first fixed contact 10 and the first movable contact 12. The first Lorentz force F1 acts in the first lateral direction (Y1). The arc is thereby elongated in the direction of the first Lorentz force F1. Also, a second Lorentz force F2 acts on the arc generated between the second fixed contact 11 and the second movable contact 13 by the magnetic field from the second outer magnet 42. The second Lorentz force F2 acts in the second lateral direction (Y2). The arc is thereby elongated in the direction of the second Lorentz force F2.

Conversely, when the current flows from the second fixed terminal 7 through the movable contact piece 8 to the first fixed terminal 6, a first Lorentz force F1' acts on the arc generated between the first fixed contact 10 and the first movable contact 12 by the magnetic field from the first outer magnet 41. The first Lorentz force F1' acts in the second lateral direction (Y2). The arc is thereby elongated in the direction of the first Lorentz force F1'. In addition, a second Lorentz force F2' acts on the arc generated between the second fixed contact 11 and the second movable contact 13 by the magnetic field from the second outer magnet 42. The second Lorentz force F2' acts in the first lateral direction (Y1). The arc is thereby elongated in the direction of the second Lorentz force F2'.

The electromagnetic relay 1 has an inner magnet 43. The inner magnet 43 generates a magnetic field for elongating the short-circuited arc AC1 between the first fixed terminal 6 and the second fixed terminal 7 in the third direction (Y1, Y2). An arrow A2 in FIG. 3 indicates the magnetic field generated by the inner magnet 43. The inner magnet 43 may be disposed, for example, so that the N pole faces downward (Z2).

As shown in FIG. 4, at least a portion of the inner magnet 43 is disposed between the first fixed terminal 6 and the second fixed terminal 7 in the first direction (X1, X2). The inner magnet 43 is disposed inside the case 2. That is, the inner magnet 43 is disposed in a shielded space inside the case 2 for extinguishing the arc. The inner magnet 43 is disposed above (Z1) the first fixed contact 10 and the second fixed contact 11.

When a current flows from the first fixed terminal 6 through the movable contact piece 8 to the second fixed terminal 7, a third Lorentz force F3 acts on the short-circuited arc AC1. The third Lorentz force F3 acts in the second lateral direction (Y2). As a result, the short-circuited arc AC1 is elongated in the direction of the third Lorentz force F3.

Conversely, when the current flows from the second fixed terminal 7 through the movable contact piece 8 to the first fixed terminal 6, a third Lorentz force F3' acts on the short-circuited arc AC1. The third Lorentz force F3' acts in the first lateral direction (Y1). Thereby, the short-circuited arc AC1 is elongated in the direction of the third Lorentz force F3'.

In the electromagnetic relay 1 according to the present embodiment described above, the arc is elongated by the magnetic field generated by the outer magnets 41 and 42. The arc is thereby quickly extinguished. Even if the arc short-circuits between the first fixed terminal 6 and the second fixed terminal 7, the magnetic field generated by the inner magnet 43 elongates the arc in the third direction (Y1, Y2). Thereby, even if an arc short-circuits between the first fixed terminal 6 and the second fixed terminal 7, the arc can be quickly extinguished. As a result, deterioration in the circuit-breaking performance of the electromagnetic relay 1 is reduced.

Although one embodiment of the claimed invention has been described above, the claimed invention is not limited to the above-described embodiment, and various modifications are possible without departing from the scope of the invention.

The structure of the drive device 4 is not limited to that of the above embodiment and may be modified. For example, in the above embodiment, the drive device 4 is disposed below (Z2) the contact device 3. However, the drive device 4 may be disposed in the first direction (X1, X2) or in the third direction (Y1, Y2) with respect to the contact device 3. In the above embodiment, the contact direction is upward (Z1) and the separation direction is downward (Z2). However, the contact direction may be downward (Z2) and the separation direction may be upward (Z1).

The structure of the contact device 3 is not limited to that of the above embodiment and may be modified. For example, the number of fixed contacts and movable contacts is not limited to two, and may be more than two. The first fixed contact may be provided separately from or integrated with the first fixed terminal 6. The second fixed contact 11 may be provided separately from or integrated with the second fixed terminal 7. The first movable contact 12 may be provided separately from or integral with the movable contact piece 8. The second movable contact 13 may be provided separately from or integral with the movable contact piece 8.

The arrangement of the magnets is not limited to that of the above embodiment and may be changed. For example, the first outer magnet 41 and the second outer magnet 42 may be disposed such that the same poles face each other. For example, the south pole of the first outer magnet 41 and the south pole of the second outer magnet 42 may be disposed to face each other.

Figure 5:
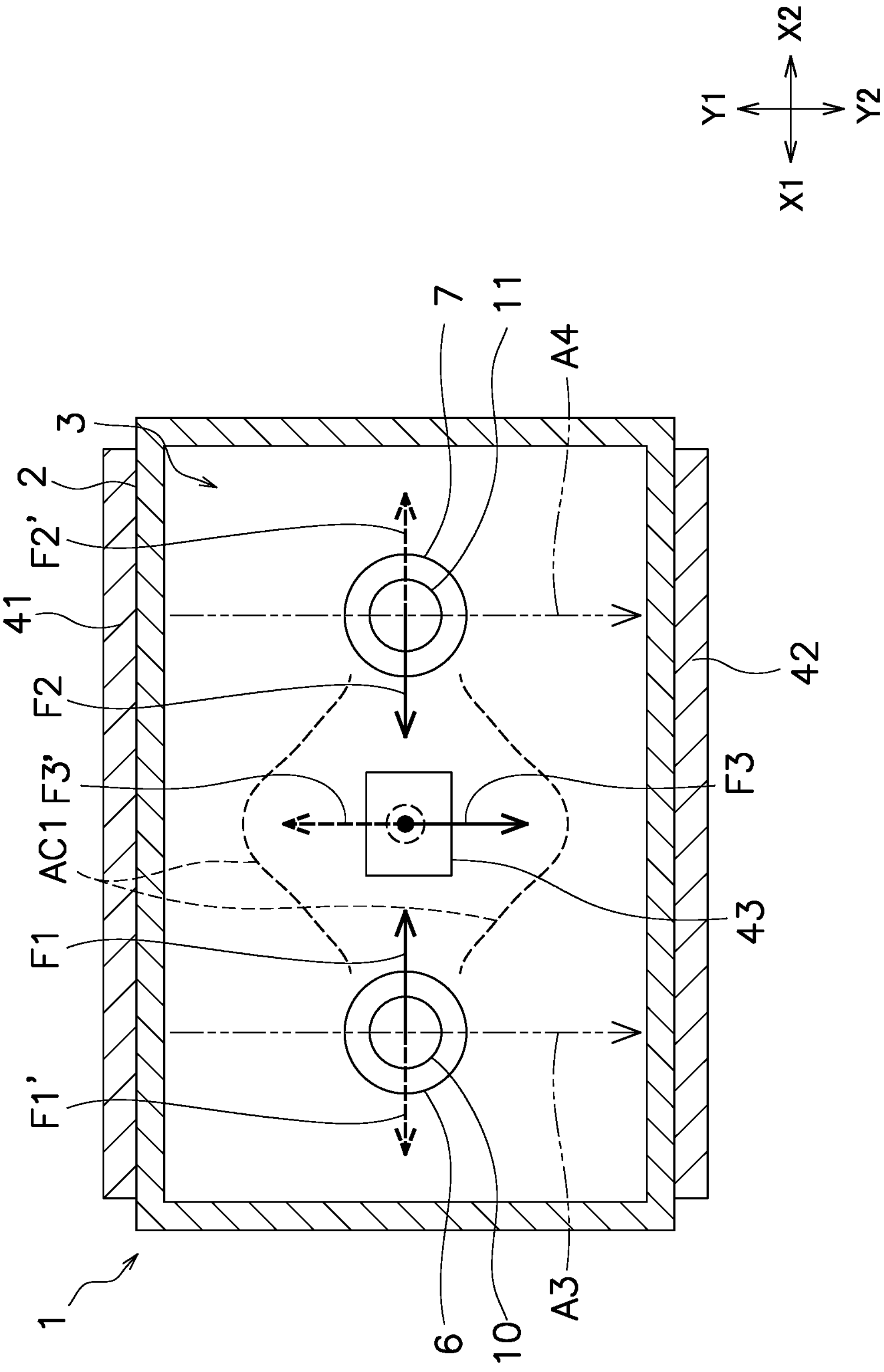
FIG. 5 is a diagram showing the electromagnetic relay according to a first modification.

FIG. 5 is a diagram showing the electromagnetic relay 1 according to a first modification. As shown in FIG. 5, the first outer magnet 41 and the second outer magnet 42 may be disposed facing each other in the third direction (Y1, Y2). In FIG. 5, arrows A3 and A4 indicate magnetic fields generated by the first outer magnet 41 and the second outer magnet. The first outer magnet 41 and the second outer magnet 42 may be disposed with different poles facing each other. For example, the north pole of the first outer magnet 41 may face the south pole of the second outer magnet 42.

In this case, when a current flows from the first fixed terminal 6 through the movable contact piece 8 to the second fixed terminal 7, a first Lorentz force F1 acts on the arc generated between the first fixed contact 10 and the first movable contact 12. The first Lorentz force F1 acts in the second longitudinal direction (X2). The arc is thereby elongated in the direction of the first Lorentz force F1. A second Lorentz force F2 acts on the arc generated between the second fixed contact 11 and the second movable contact 13. The second Lorentz force F2 acts in the first longitudinal direction (X1). The arc is thereby elongated in the direction of the second Lorentz force F2. A third Lorentz force F3 acts on the short-circuited arc AC1. The third Lorentz force F3 acts in the second lateral direction (Y2). As a result, the short-circuited arc AC1 is elongated in the direction of the third Lorentz force F3.

Conversely, when the current flows from the second fixed terminal 7 through the movable contact piece 8 to the first fixed terminal 6, a first Lorentz force F1' acts on the arc generated between the first fixed contact 10 and the first movable contact 12. The first Lorentz force F1' acts in the first longitudinal direction (X1). The arc is thereby elongated in the direction of the first Lorentz force F1'. A second Lorentz force F2' acts on the arc generated between the second fixed contact 11 and the second movable contact 13. The second Lorentz force F2' acts in the second longitudinal direction (X2). The arc is thereby elongated in the direction of the second Lorentz force F2'. A third Lorentz force F3' acts on the short-circuited arc AC1. The third Lorentz force F3' acts in the first lateral direction (Y1). Thereby, the short-circuited arc AC1 is elongated in the direction of the third Lorentz force F3'.

The first outer magnet 41 and the second outer magnet 42 may be disposed with the same poles facing each other. The arrangement of the first outer magnet 41 and the second outer magnet 42 of the above embodiment and the first outer magnet 41 and the second outer magnet 42 of the first embodiment may be combined. That is, the outer magnets 41 and 42 may be disposed in the first longitudinal direction (X1), the second longitudinal direction (X2), the first lateral direction (Y1), and the second lateral direction (Y2) of the case 2, respectively.

Figure 6:
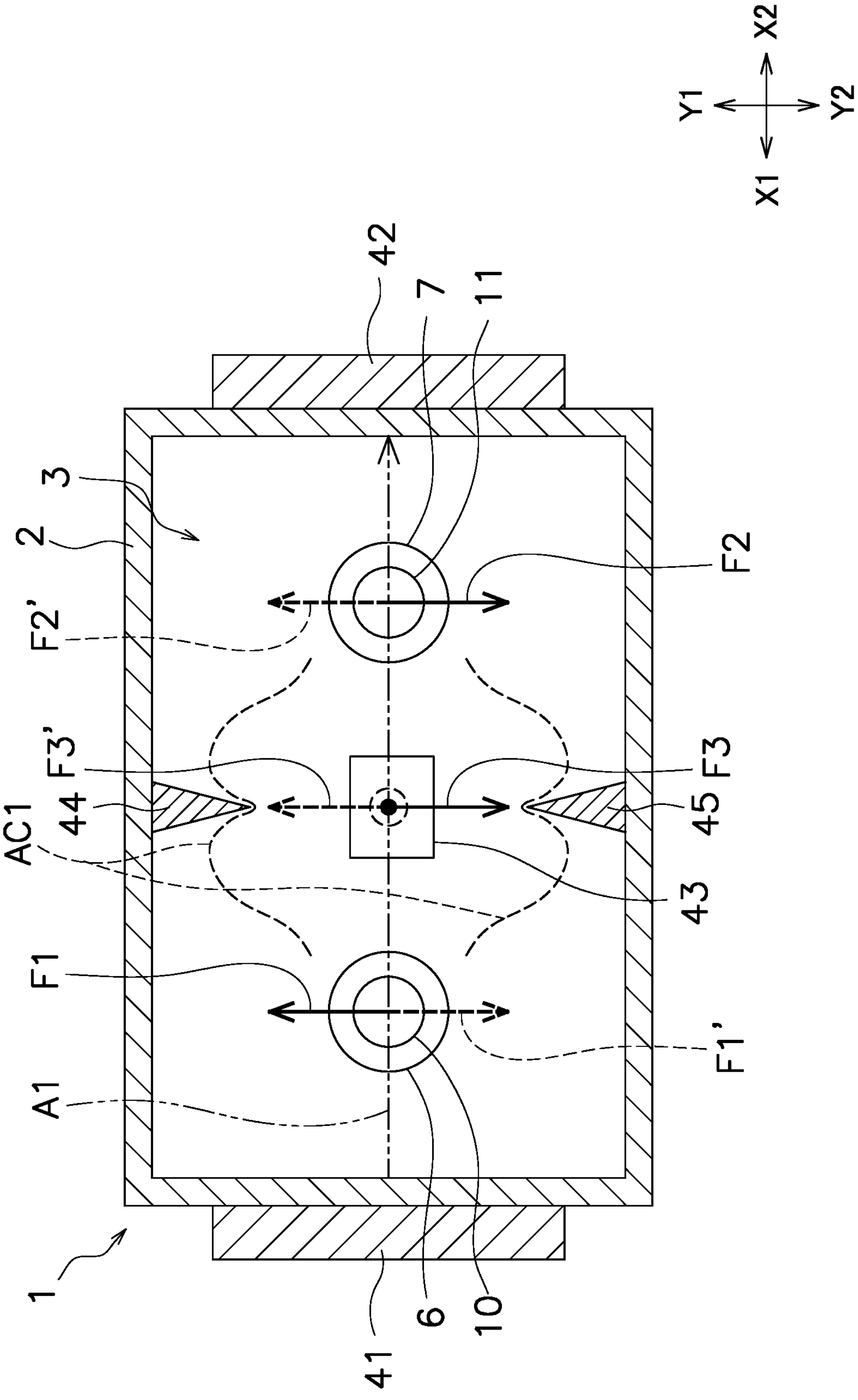
FIG. 6 is a diagram showing the electromagnetic relay according to a second modification.

FIG. 6 is a diagram showing the electromagnetic relay 1 according to a second modification. As shown in FIG. 6, the electromagnetic relay 1 may include a first protrusion 44 and a second protrusion 45. The first protrusion 44 and the second protrusion 45 may be disposed to protrude in the third direction (Y1, Y2) with respect to the outer magnets 41 and 42 as seen from the second direction (Z1, Z2). The first protrusion 44 and the second protrusion 45 may extend toward the region between the first fixed contact 10 and the second fixed contact 11.

Specifically, the first protrusion 44 may be disposed in the first lateral direction (Y1) with respect to the outer magnets 41 and 42. The second protrusion 45 may be disposed on the side opposite to the first protrusion 44 in the third direction (Y1, Y2). That is, the second protrusion 45 may be disposed in the second lateral direction (Y2) with respect to the outer magnets 41 and 42. The first and second protrusions 44 and 45 may extend toward the inner magnet 43.

The first and second protrusions 44 and 45 may have a tapered shape, tapering toward the inner magnet 43. The first protrusion 44 may have a tapered shape toward the second lateral direction (Y2). The second protrusion 45 may have a tapered shape toward the first lateral direction (Y1). The first and second protrusions 44 and 45 may be made of an insulating material such as resin or ceramic. In this case, the arc AC1 elongated in the third direction (Y1, Y2) by the inner magnet 43 is spread in the first direction (X1, X2) by the first and second protrusions 44 and 45. The arc AC1 is thereby quickly extinguished.

Figure 7:
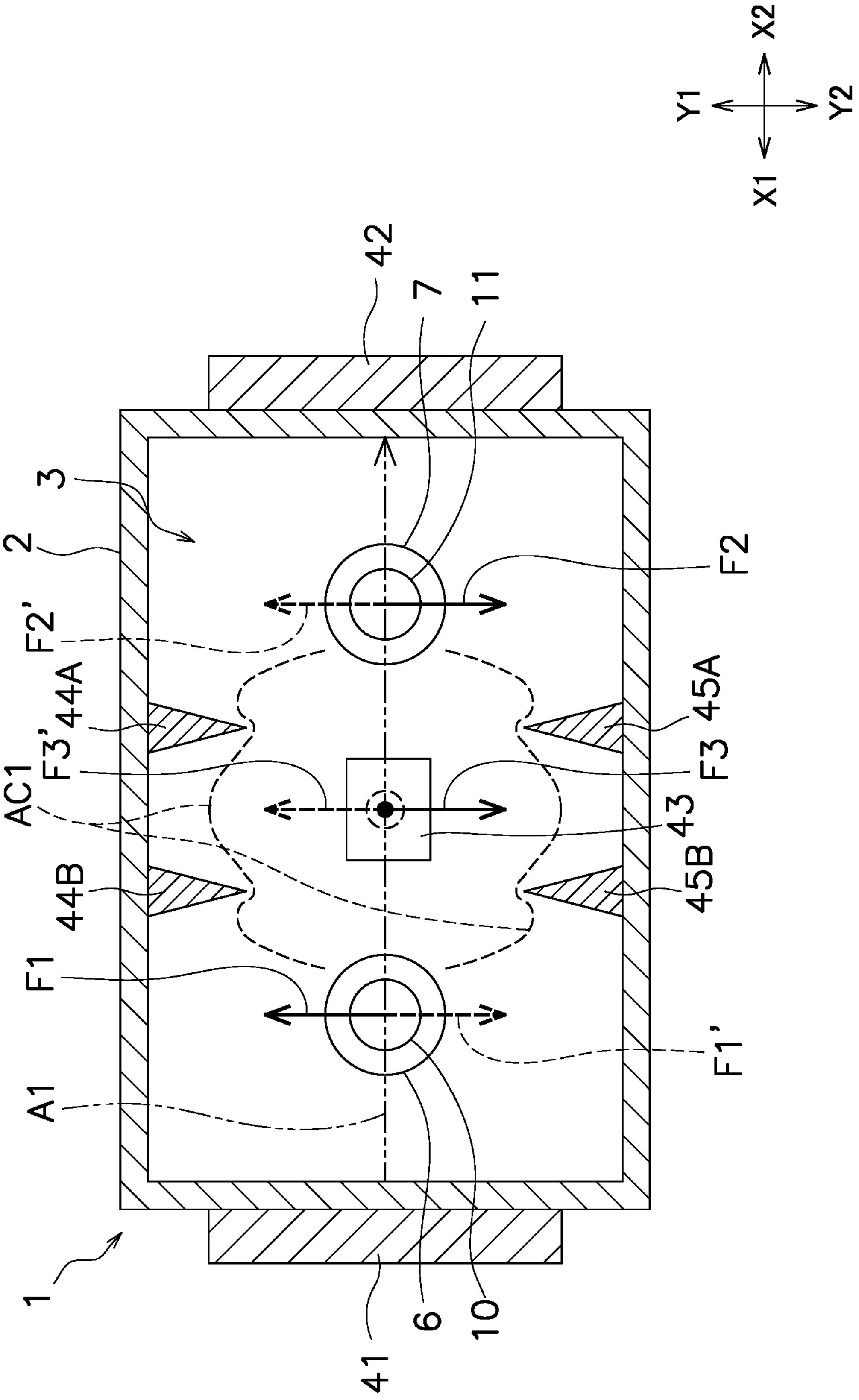
FIG. 7 is a diagram showing the electromagnetic relay according to a third modification.

FIG. 7 is a diagram showing the electromagnetic relay 1 according to a third modification. As shown in FIG. 7, the electromagnetic relay 1 may include a plurality of first protrusions 44A and 44B and a plurality of second protrusions 45A and 45B.

Figure 8:
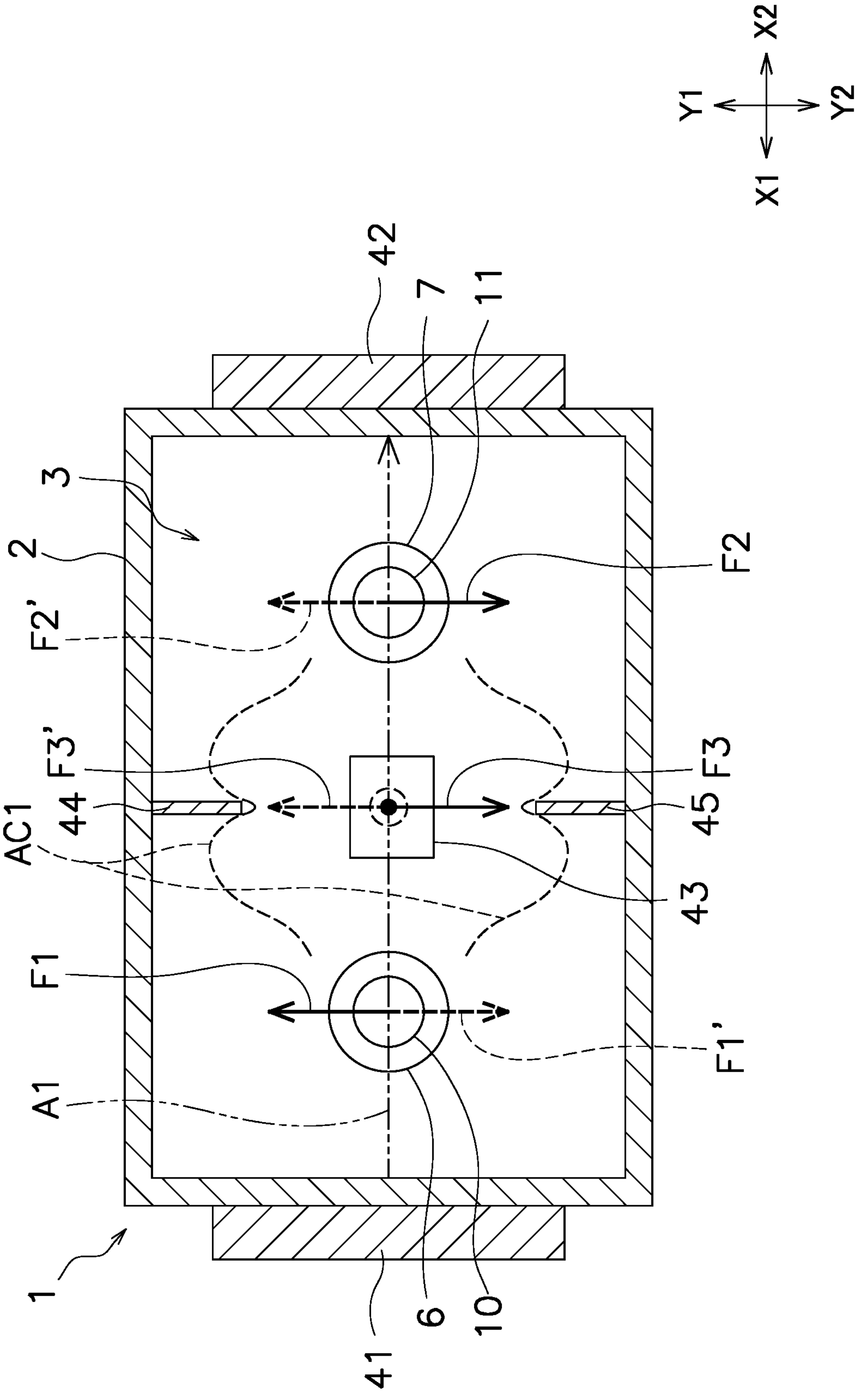
FIG. 8 is a diagram showing the electromagnetic relay according to a fourth modification.

The shape of the protrusions is not limited to the tapered shape as in the above embodiment and may be another shape. FIG. 8 is a diagram showing the electromagnetic relay 1 according to a fourth modification. As shown in FIG. 8, the protrusions 44 and may have a linear shape.

Figure 9:
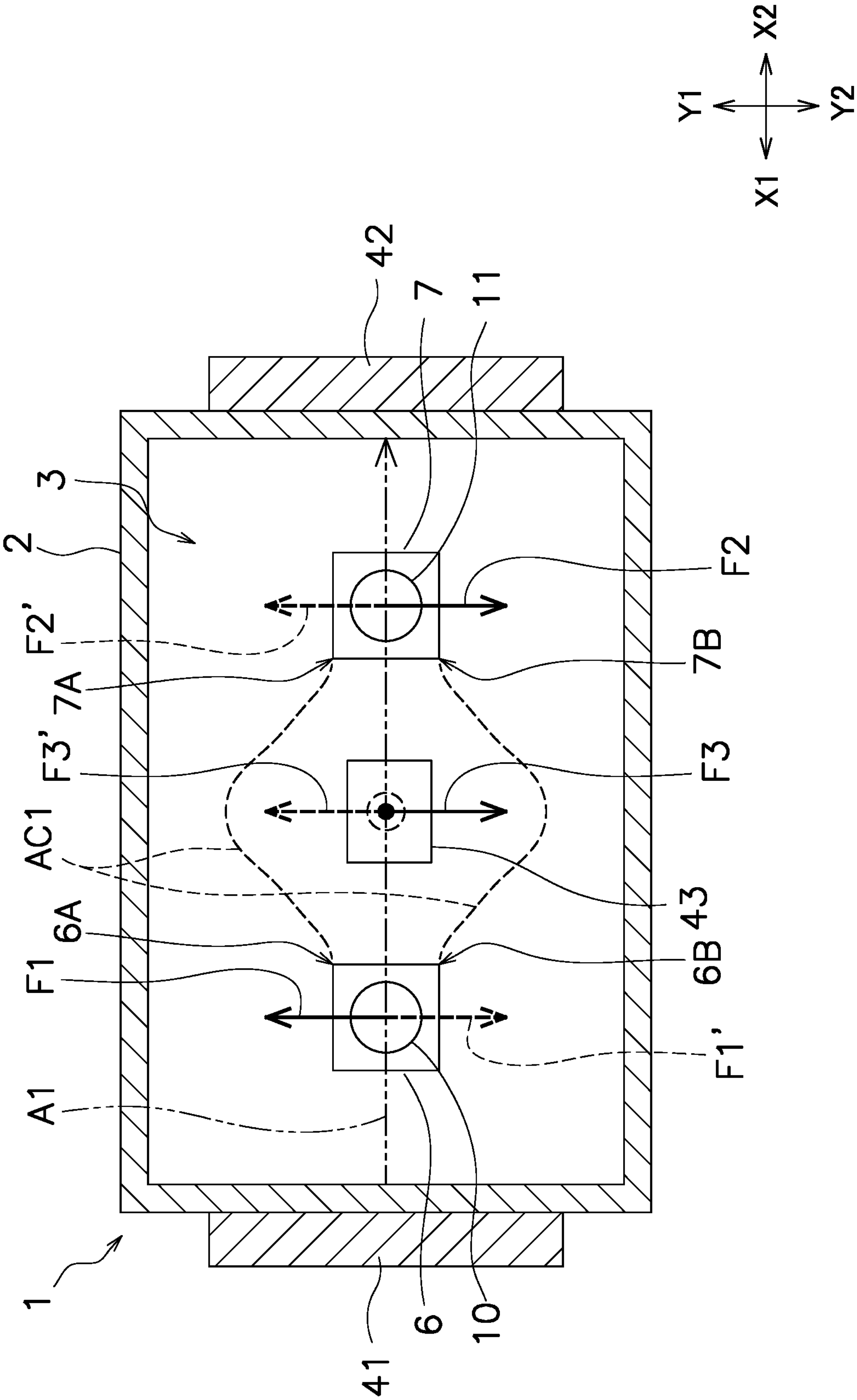
FIG. 9 is a diagram showing the electromagnetic relay according to a fifth modification.

The shape of the fixed terminals 6 and 7 is not limited to the cylindrical shape as in the above embodiment and may be another shape. FIG. 9 is a diagram showing the electromagnetic relay 1 according to a fifth modification. As shown in FIG. 9, the fixed terminals 6 and 7 may have a square prism shape. The first fixed terminal 6 may include first corners 6A and 6B facing outward of the first fixed terminal 6 as seen from the second direction (Z1, Z2). The second fixed terminal 7 may include second corners 7A and 7B facing outward of the second fixed terminal 7 as seen in the second direction (Z1, Z2).

The first corner 6A may face the second longitudinal direction (X2) and the first lateral direction (Y1). The first corner 6B may face the second longitudinal direction (X2) and the second lateral direction (Y2). The second corner 7A may face the first longitudinal direction (X1) and the first lateral direction (Y1). The second corner 7B may face the first longitudinal direction (X1) and the second lateral direction (Y2). In this case, the direction in which the arc is elongated can be controlled in the directions in which the corners 6A, 6B, 7A, and 7B are directed.

Figure 10:
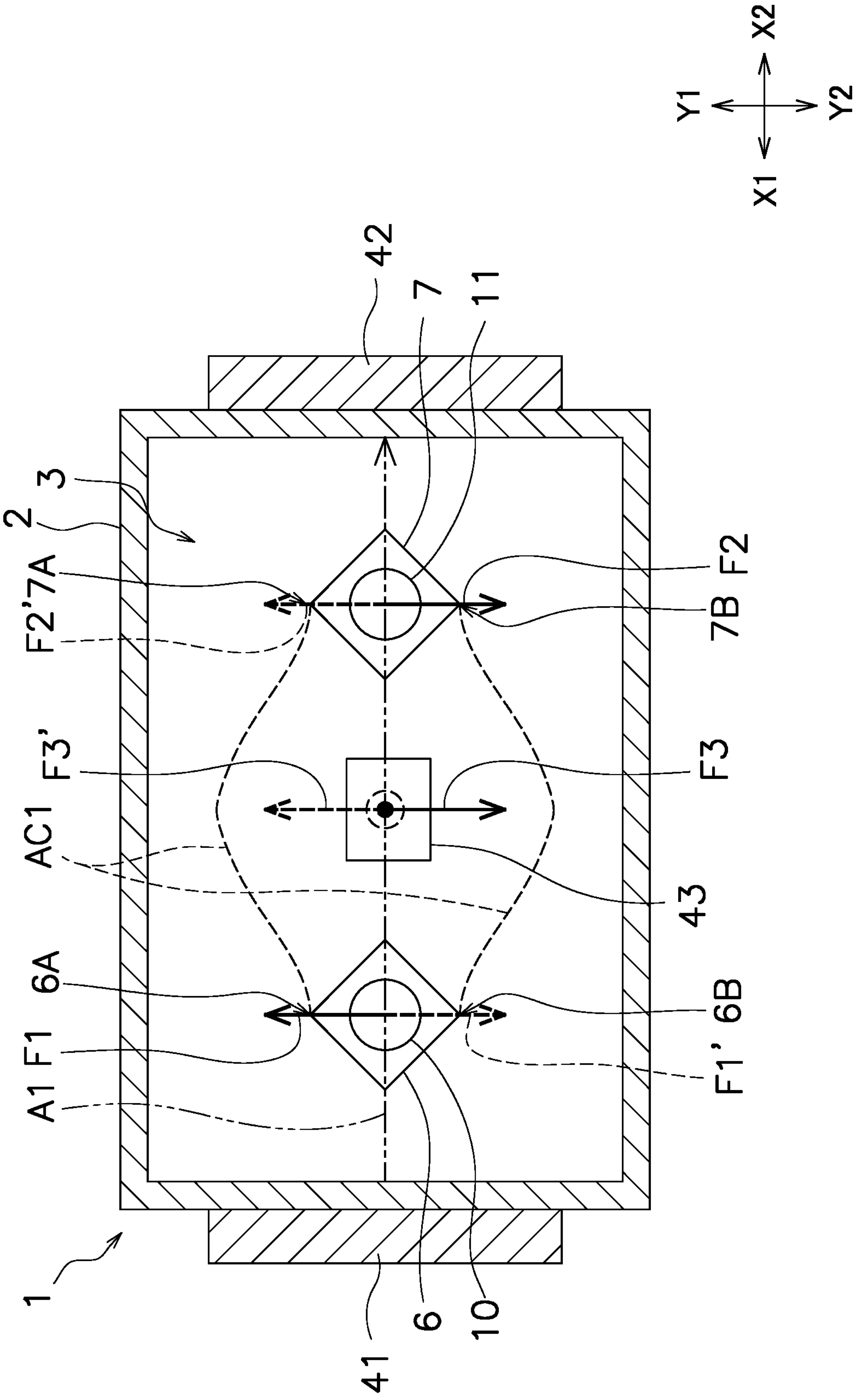
FIG. 10 is a diagram showing the electromagnetic relay according to a sixth modification.

FIG. 10 is a diagram showing the electromagnetic relay 1 according to a sixth modification. As shown in FIG. 10, the first corners 6A and 6B and the second corners 7A and 7B may face the third direction (Y1, Y2). The first corner 6A and the second corner 7A may face the first lateral direction (Y1). The first corner 6B and the second corner 7B may face the second lateral direction (Y2).

Figure 11:
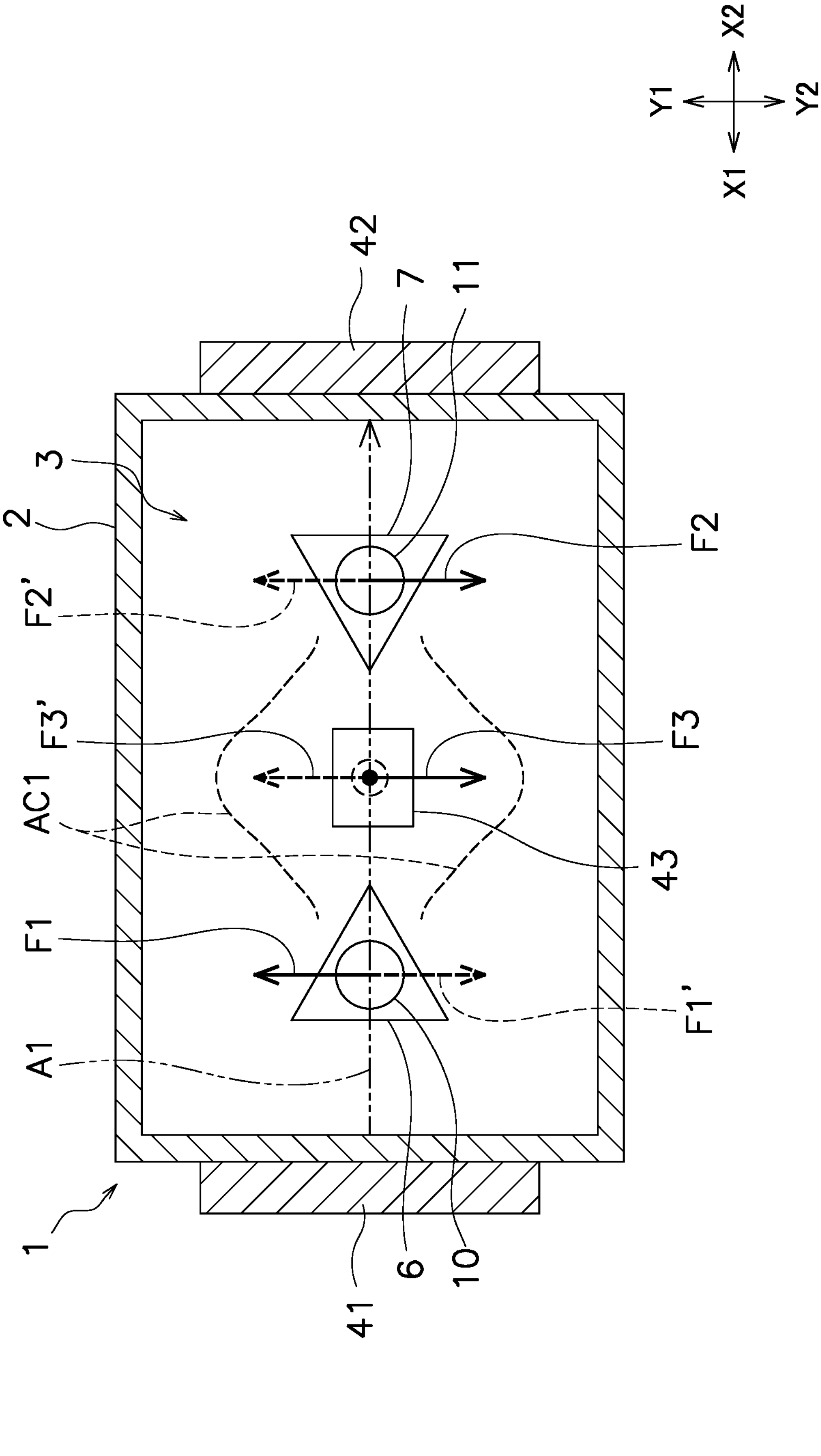
FIG. 11 is a diagram showing the electromagnetic relay according to a seventh modification.

The fixed terminals 6 and 7 are not limited to having a rectangular prism shape and may have another shape. FIG. 11 is a diagram showing the electromagnetic relay 1 according to a seventh modification. As shown in FIG. 11, the fixed terminals 6 and 7 may have a triangular prism shape. Alternatively, the fixed terminals 6 and 7 may have a shape other than a triangular prism.

Figure 12:
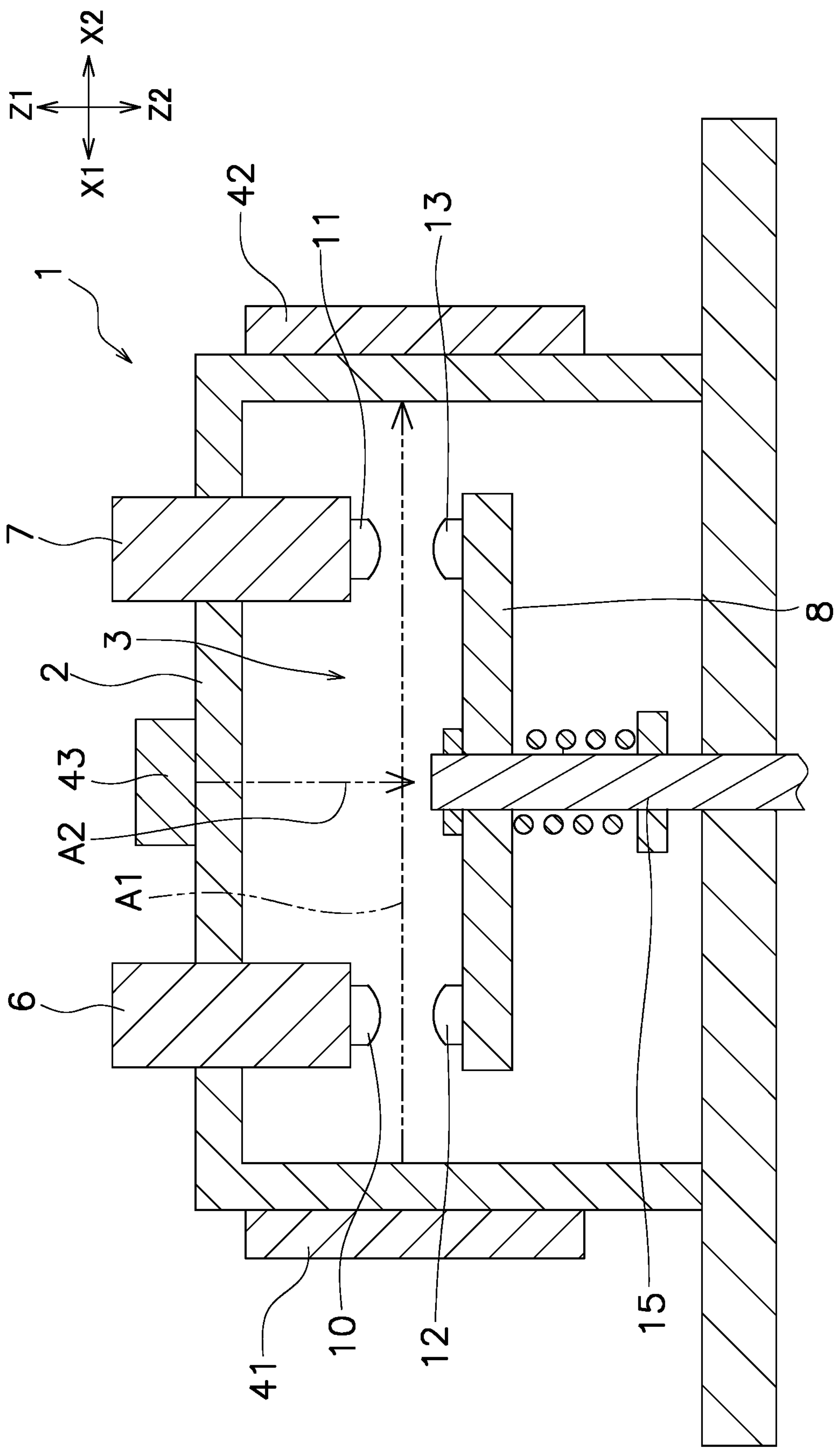
FIG. 12 is a diagram showing the electromagnetic relay according to an eighth modification.

The shape or arrangement of the inner magnet 43 is not limited to those in the above embodiment and may be changed. In the above embodiments, the inner magnet 43 is disposed in the shielded space inside the case 2. However, the inner magnet 43 may be disposed outside the shielded space. FIG. 12 is a diagram showing the electromagnetic relay 1 according to an eighth modification. As shown in FIG. 12, the inner magnet 43 may be disposed outside the case 2.

Figure 13:
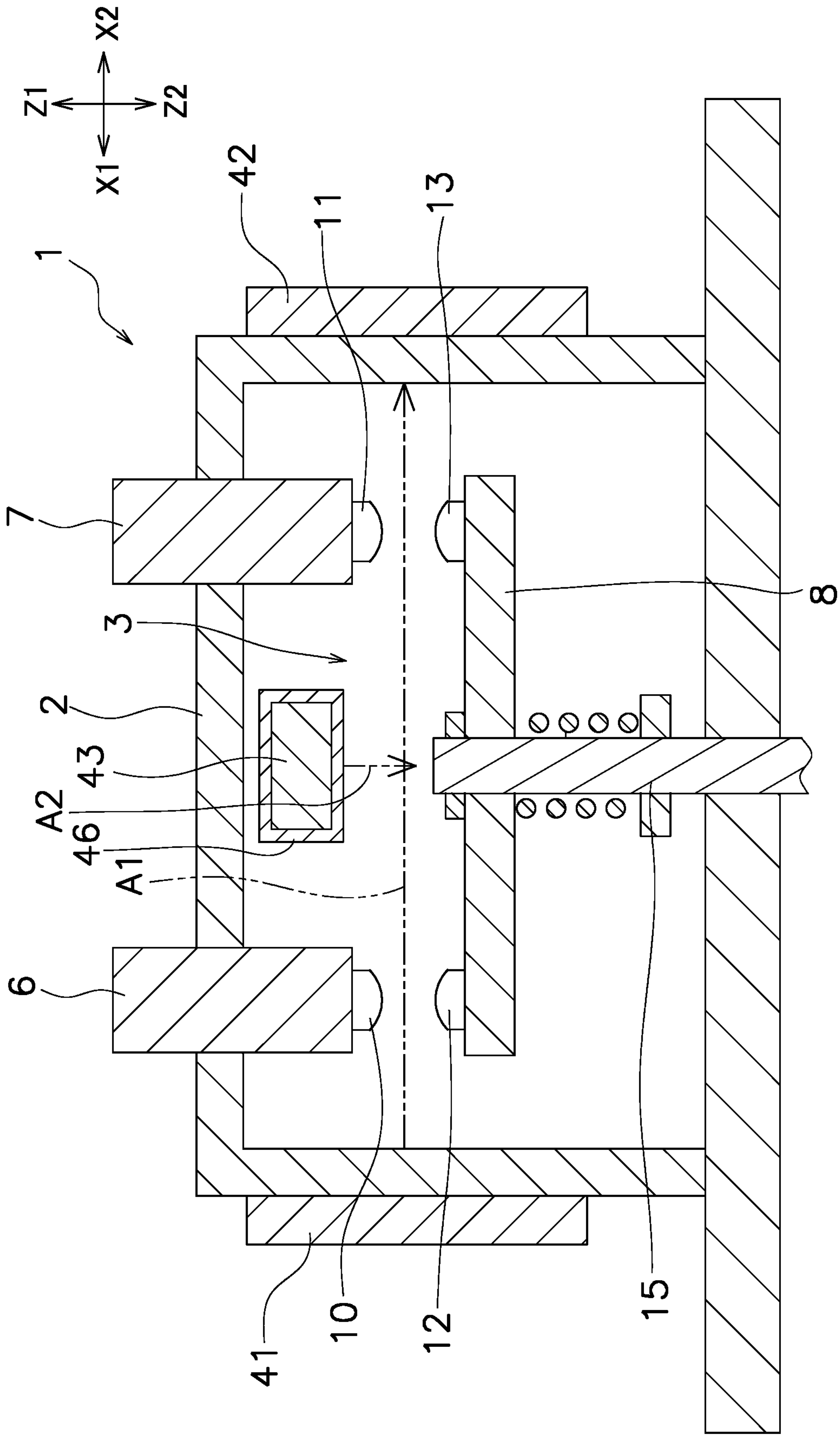
FIG. 13 is a diagram showing the electromagnetic relay according to a ninth modification.

FIG. 13 is a diagram showing the electromagnetic relay 1 according to a ninth modification. As shown in FIG. 13, the inner magnet 43 may be covered with an insulating material 46 such as resin or ceramic. For example, the entire inner magnet 43 may be covered with the insulating material 46.

Figure 14:
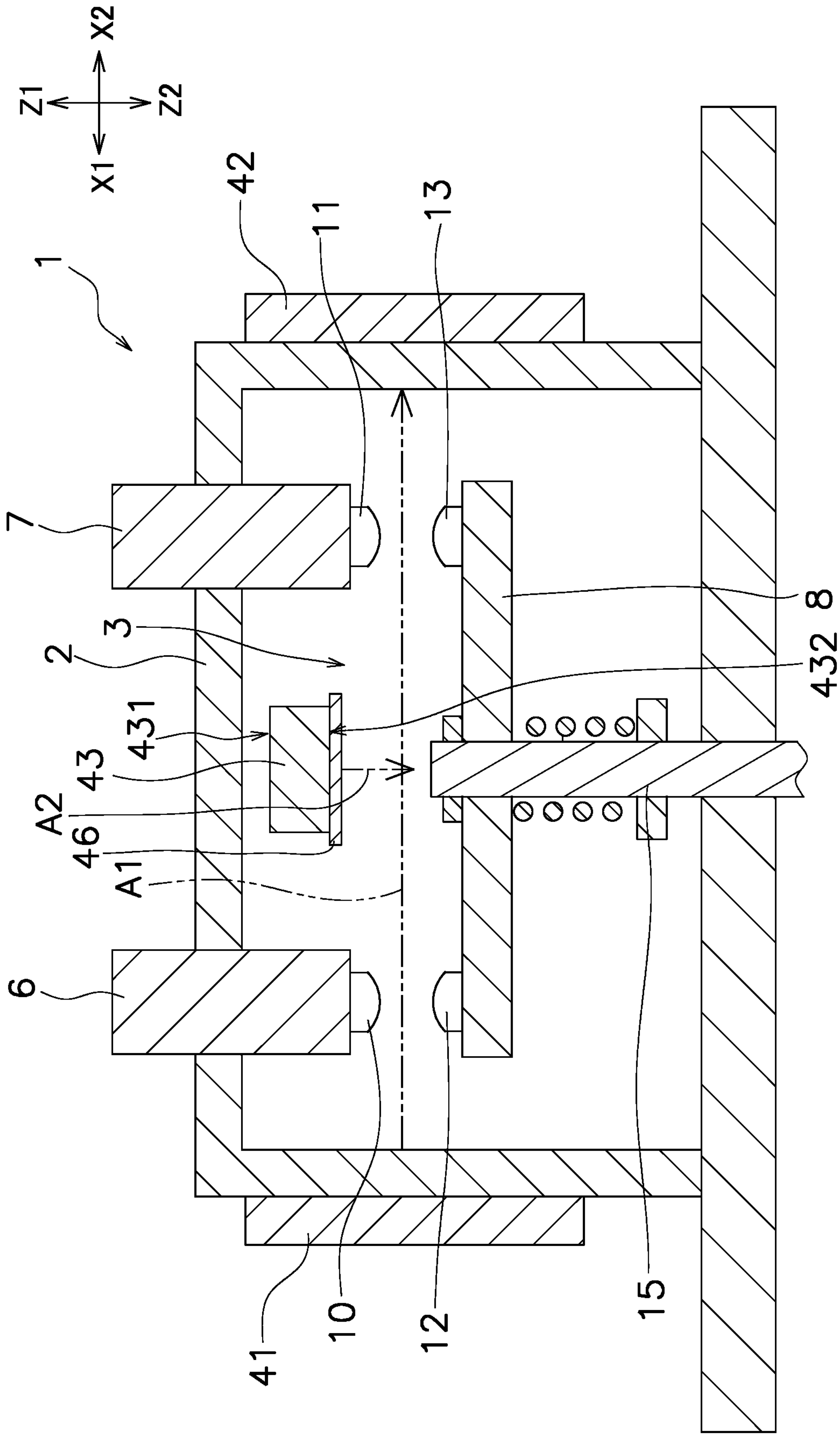
FIG. 14 is a diagram showing the electromagnetic relay according to a tenth modification.

Alternatively, FIG. 14 is a diagram showing the electromagnetic relay 1 according to a tenth modification. As shown in FIG. 14, only a portion of the inner magnet 43 may be covered with the insulating material 46. The inner magnet 43 includes a first surface 431 and a second surface 432. The first surface 431 is the top surface of the inner magnet 43. The second surface 432 is the bottom surface of the inner magnet 43. The second surface 432 is closer to the first fixed contact 10 and the second fixed contact 11 than the first surface 431 is. The second surface 432 faces a space between the first fixed terminal 6 and the second fixed terminal 7. At least the second surface 432 of the inner magnet 43 may be covered with the insulating material 46.

In the above embodiment, the entire inner magnet 43 is located between the first fixed terminal 6 and the second fixed terminal 7 in the first direction (X1, X2). That is, the inner magnet 43 is disposed at a position not overlapping the first fixed terminal 6 and the second fixed terminal 7 as seen from the second direction (Z1, Z2). However, a part of the inner magnet 43 may be disposed at a position overlapping the first fixed terminal 6 and the second fixed terminal 7 as seen from the second direction (Z1, Z2).

Figure 15:
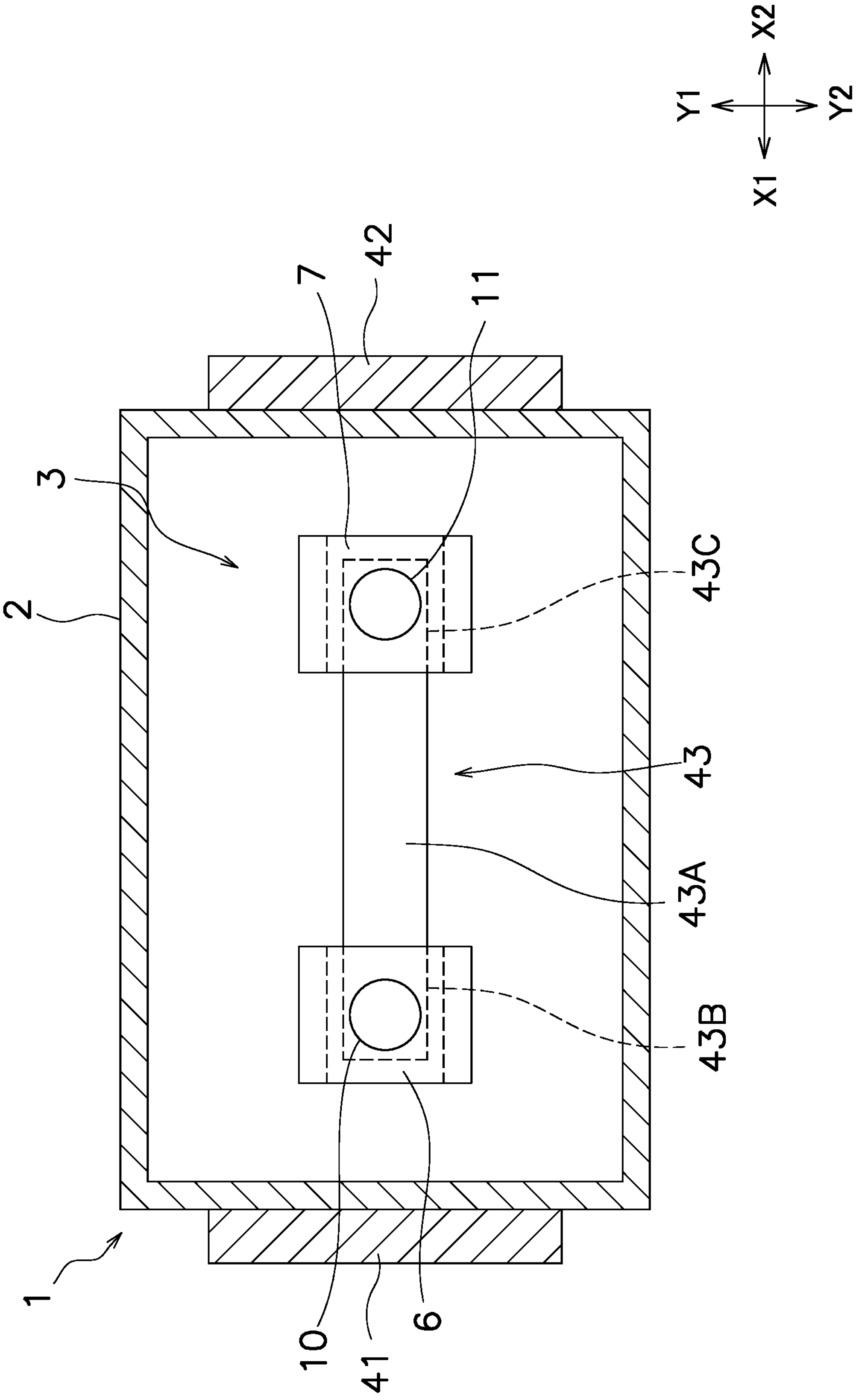
FIG. 15 is a diagram showing the electromagnetic relay according to an eleventh modification.

For example, FIG. 15 is a diagram showing the electromagnetic relay 1 according to an eleventh modification. As shown in FIG. 15, the inner magnet 43 may include an intermediate portion 43A, a first portion 43B, and a second portion 43C. The intermediate portion 43A may be located between the first fixed terminal 6 and the second fixed terminal 7 as seen from the second direction (Z1, Z2). The intermediate portion 43A does not need to overlap the first fixed terminal 6 and the second fixed terminal 7 as seen from the second direction (Z1, Z2). The first portion 43B may overlap the first fixed terminal 6 as seen from the second direction (Z1, Z2). The second portion 43C may overlap the second fixed terminal 7 as seen from the second direction (Z1, Z2).

Figure 16:
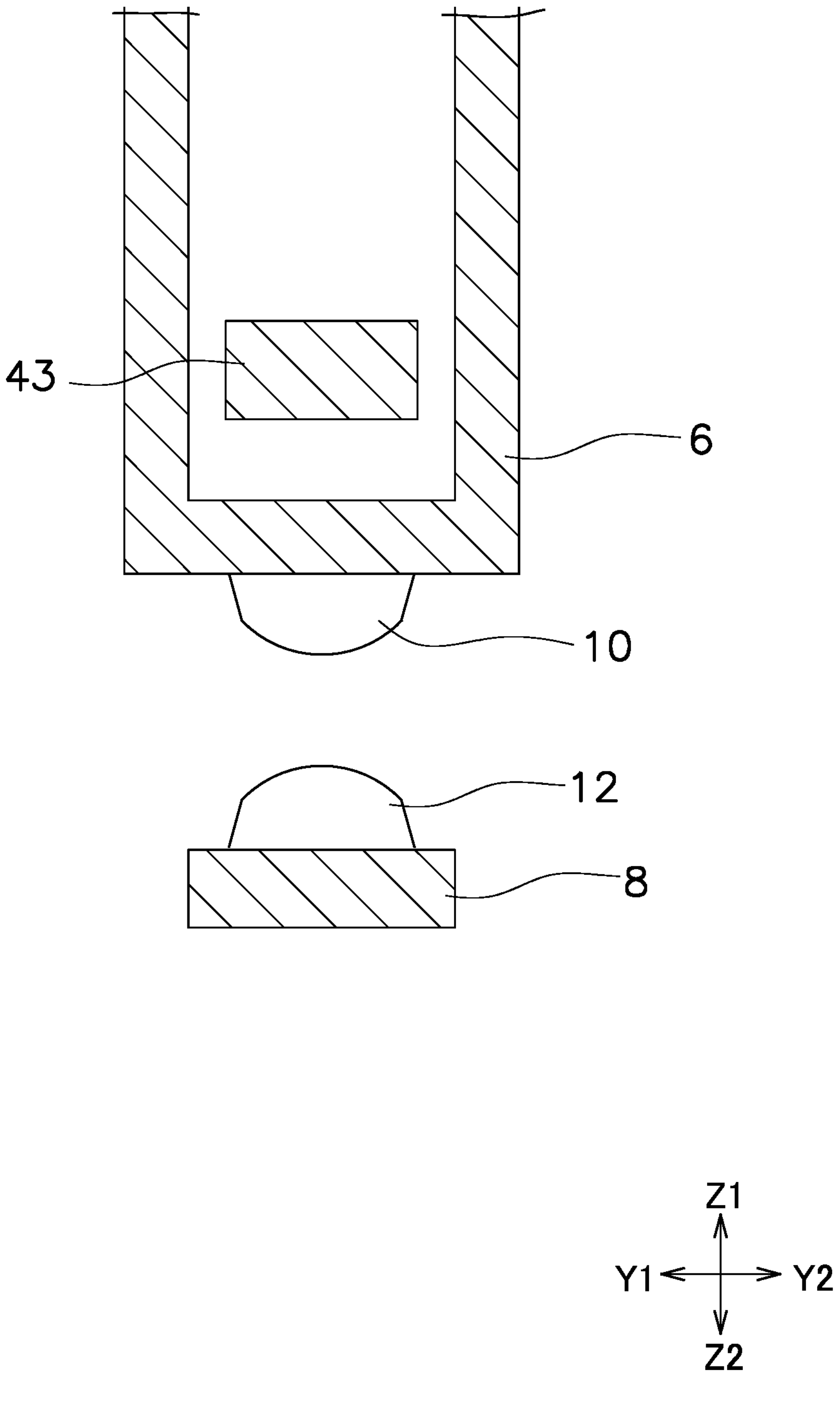
FIG. 16 is a diagram showing the first fixed terminal according to the eleventh modification.
Figure 17:
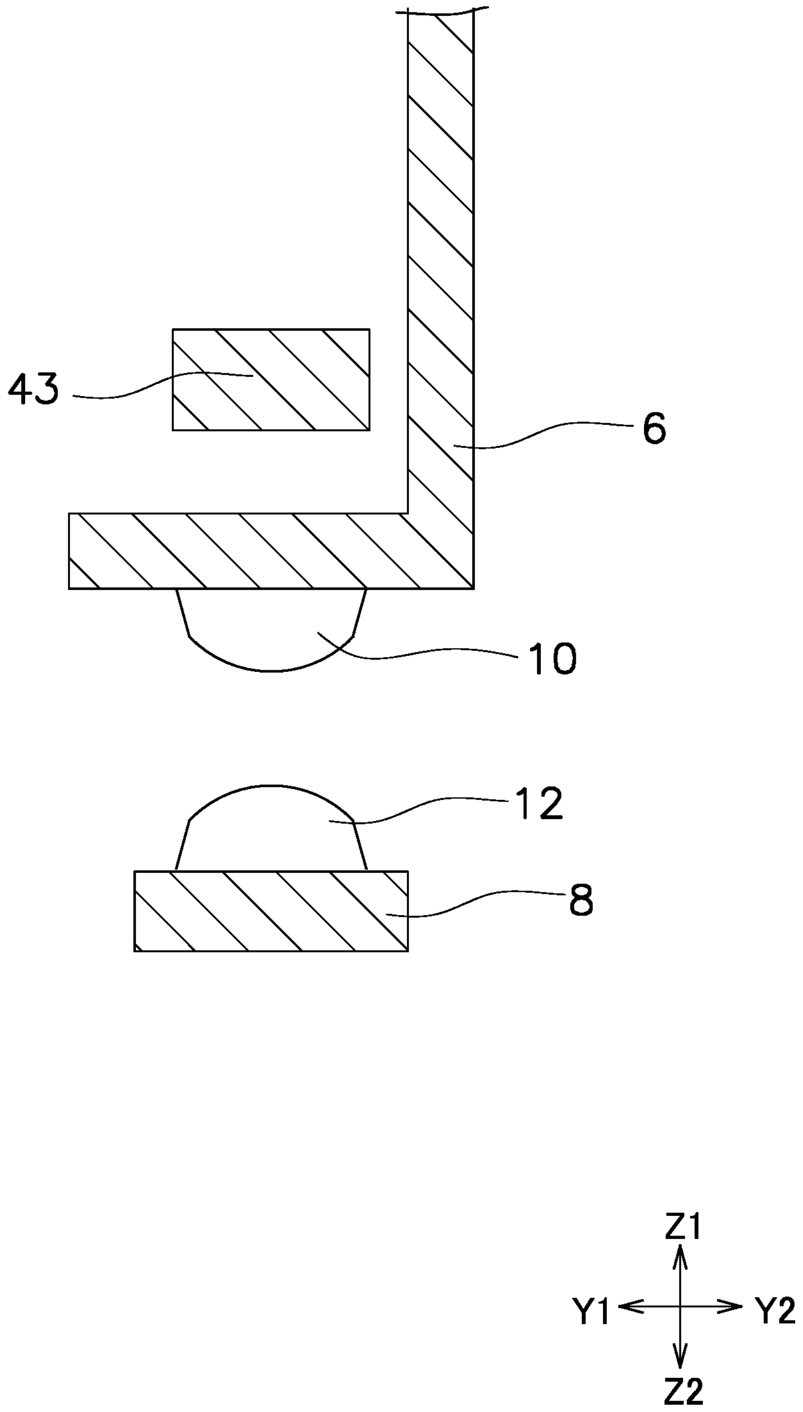
FIG. 17 is a diagram showing another example of the first fixed terminal according to the eleventh modification.

In this case, as shown in FIG. 16, the first fixed terminal 6 may have a U-shape as seen from the first direction (X1, X2). Alternatively, as shown in FIG. 17, the first fixed terminal 6 may have an L-shape as seen from the first direction (X1, X2). The second fixed terminal 7 may have the same shape as the first fixed terminal 6.

Figure 18:
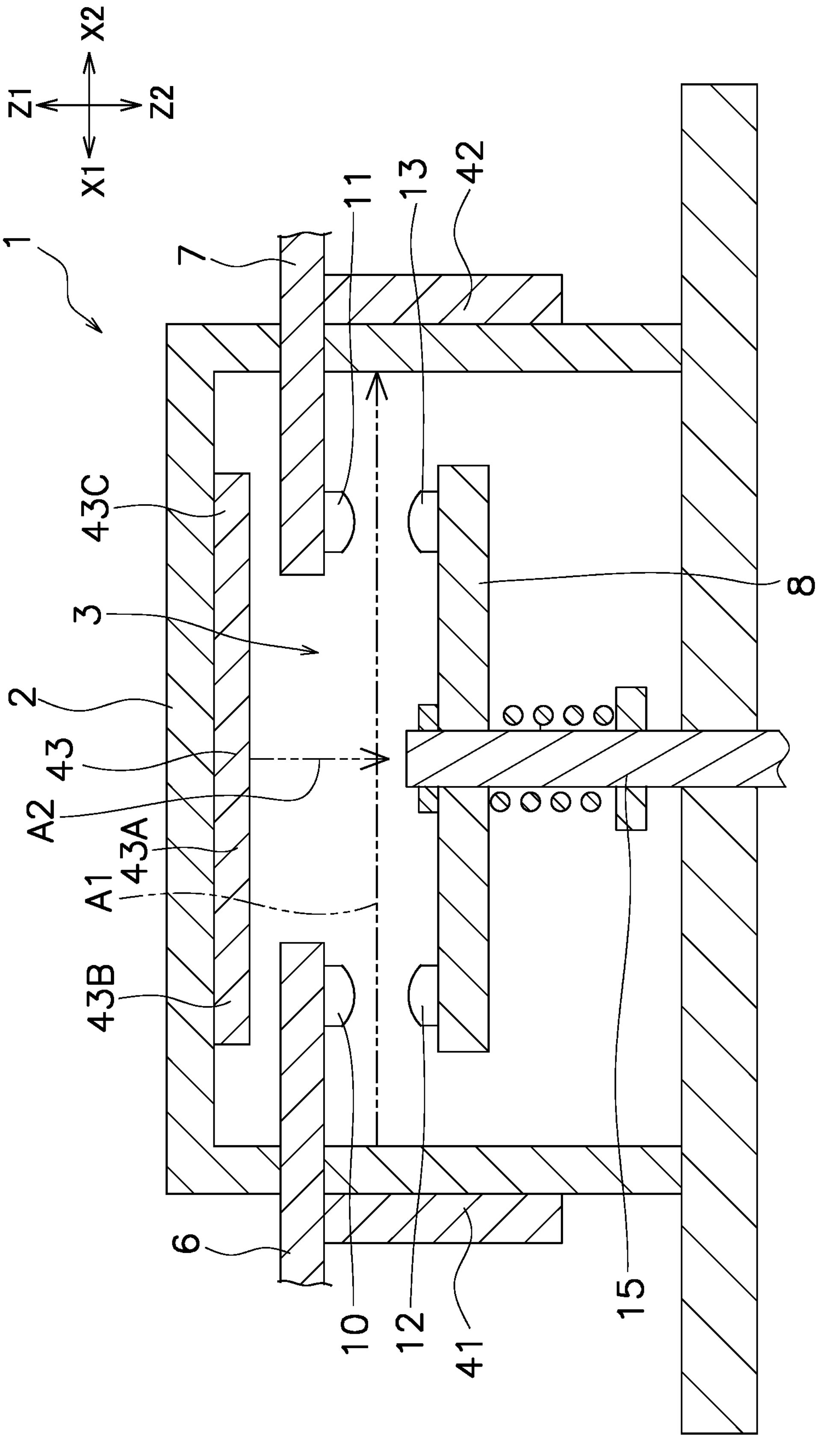
FIG. 18 is a diagram showing the electromagnetic relay according to a twelfth modification.
Figure 19:
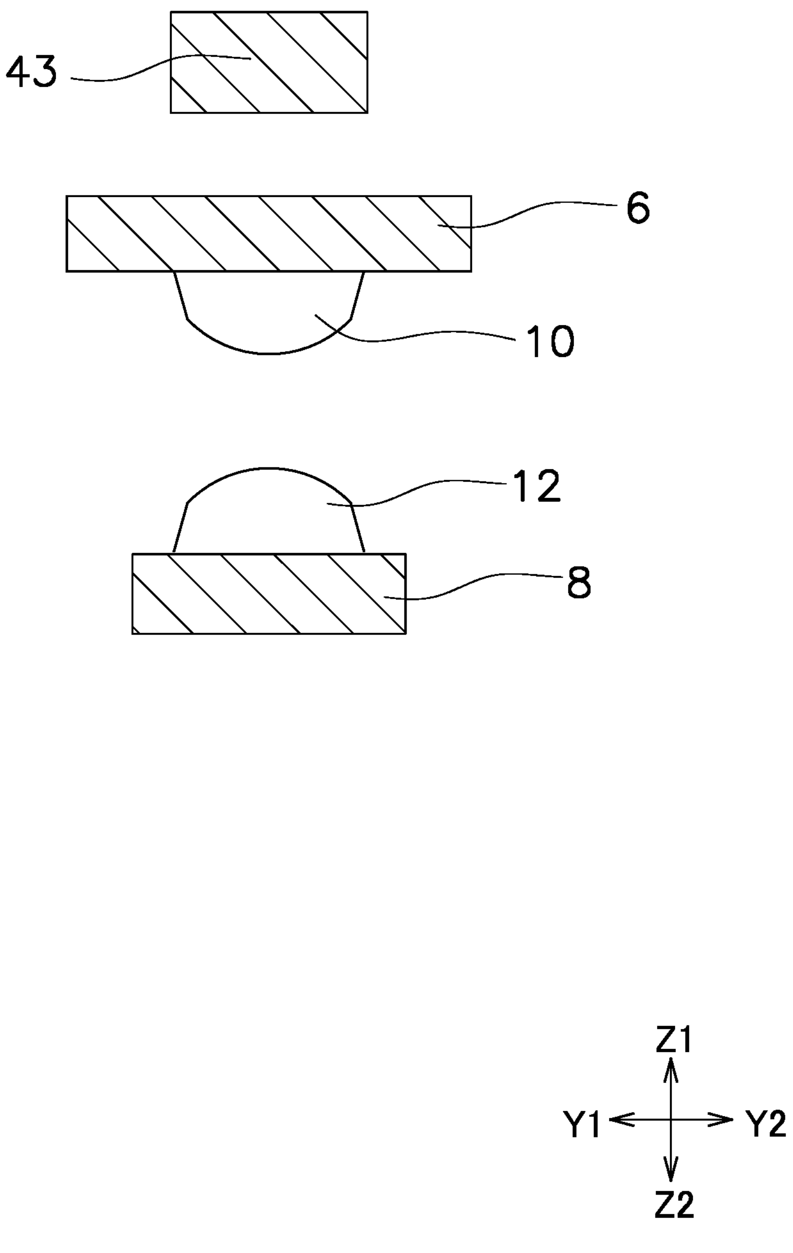
FIG. 19 is a diagram showing the first fixed terminal according to the twelfth modification.

FIG. 18 is a diagram showing the electromagnetic relay 1 according to a twelfth modification. As shown in FIG. 18, the first fixed terminal 6 and the second fixed terminal 7 may extend in the first direction (X1, X2). Specifically, the first fixed terminal 6 may include a portion extending from the first fixed contact 10 in the first longitudinal direction (X1). The second fixed terminal 7 may include a portion extending from the second fixed contact 11 in the second longitudinal direction (X2). In this case, as shown in FIG. 19, the first fixed terminal 6 may have a plate-like shape. The second fixed terminal 7 may have the same shape as the first fixed terminal 6.

REFERENCE SIGNS LIST

4: Drive device, 6: First fixed terminal, 6A: First corner, 7: Second fixed terminal, 7A: Second corner, 8: Movable contact piece, 10: First fixed contact, 11: Second fixed contact 12: First movable contact 13: Second movable contact 41: First outer magnet 43: Inner magnet 43A: Intermediate portion 43B: First portion 43C: Second portion 44: First projection 46: Insulating material 431: First surface 432: Second surface

The invention claimed is:

1. An electromagnetic relay, comprising:
- a first fixed terminal;
- a first fixed contact connected to the first fixed terminal;
- a second fixed terminal disposed apart from the first fixed terminal in a first direction;
- a second fixed contact connected to the second fixed terminal;
- a first movable contact disposed to face the first fixed contact in a second direction that intersects with the first direction;
- a second movable contact disposed to face the second fixed contact in the second direction;
- a movable contact piece connected to the first movable contact and the second movable contact;
- a drive device configured to move the movable contact piece in the second direction;
- an outer magnet disposed outside the first fixed terminal and the second fixed terminal, the outer magnet being configured to generate a first magnetic field to elongate an arc generated between the first fixed contact and the first movable contact and between the second fixed contact and the second movable contact; and
- an inner magnet at least partially disposed between the first fixed terminal and the second fixed terminal as seen from the second direction, the inner magnet being configured to generate a second magnetic field to elongate the arc in a third direction that intersects with the first direction and the second direction, the inner magnet being structured and arranged to extend a short-circuited arc between the first fixed terminal and the second fixed terminal,
- wherein the inner magnet includes a first surface and a second surface closer to the first fixed contact and the second fixed contact than the first surface, and
- the inner magnet is disposed so that a magnetic pole face of the inner magnet faces in the second direction such that, when viewed from the first direction, the inner magnet does not overlap with a space between the first fixed contact and the first movable contact in an open state nor with a space between the second fixed contact and the second movable contact in an open state.

2. The electromagnetic relay according to claim 1, further comprising:

a protrusion disposed in the third direction with respect to the outer magnet and extending toward the inner magnet.

3. The electromagnetic relay according to claim 2, wherein the protrusion has a tapered shape toward the inner magnet.

4. The electromagnetic relay according to claim 2, wherein the protrusion is made of an insulating material.

5. The electromagnetic relay according to claim 1, wherein the first fixed terminal includes a first corner facing outward of the first fixed terminal.

6. The electromagnetic relay according to claim 1, wherein the second fixed terminal includes a second corner facing outward of the second fixed terminal.

7. The electromagnetic relay according to claim 1, wherein the inner magnet includes an intermediate portion located between the first fixed terminal and the second fixed terminal as seen from the second direction; a first portion that overlaps with the first fixed terminal as seen from the second direction; and a second portion that overlaps with the second fixed terminal as seen from the second direction.

8. The electromagnetic relay according to claim 1, wherein the second surface faces a space between the first fixed terminal and the second fixed terminal.

9. The electromagnetic relay according to claim 1, wherein the inner magnet is located between the first fixed terminal and the second fixed terminal in the first direction.

10. The electromagnetic relay according to claim 9, wherein the inner magnet is disposed at a position not overlapping the first fixed terminal and the second fixed terminal as seen from the second direction.

* * * * *